(12) United States Patent
Shiga et al.

(10) Patent No.: US 6,930,430 B2
(45) Date of Patent: Aug. 16, 2005

(54) ARMATURE SUPPORT STRUCTURE OF STARTER FOR AUTOMOTIVE ENGINE

(75) Inventors: Tsutomu Shiga, Nukata-gun (JP); Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 10/685,442

(22) Filed: Oct. 16, 2003

(65) Prior Publication Data

US 2004/0080236 A1 Apr. 29, 2004

(30) Foreign Application Priority Data

Oct. 24, 2002 (JP) ........................................ 2002-309987

(51) Int. Cl.[7] ........................ H03K 13/00; H02K 13/04; H02K 5/173
(52) U.S. Cl. ........................ 310/237; 310/90; 290/39; 290/38 R; 74/7 E
(58) Field of Search ........................ 310/90, 237, 201; 290/38 R, 38 A, 49; 74/7 A, 7 E

(56) References Cited

U.S. PATENT DOCUMENTS

| | | | | |
|---|---|---|---|---|
| 2,456,993 A | * | 12/1948 | Rambo et al. ............. | 310/237 |
| 4,816,712 A | * | 3/1989 | Tanaka ....................... | 310/237 |
| 4,978,874 A | * | 12/1990 | Isozumi et al. ............. | 310/83 |
| 5,834,852 A | * | 11/1998 | Katoh et al. ............... | 290/38 R |
| 5,945,742 A | * | 8/1999 | Araki et al. ............... | 290/38 R |
| 6,114,772 A | | 9/2000 | Araki et al. ................ | 290/48 |
| 6,861,781 B2 | * | 3/2005 | Niimi et al. ............... | 310/233 |
| 2004/0070209 A1 | * | 4/2004 | Shiga et al. ............... | 290/38 R |
| 2004/0080236 A1 | * | 4/2004 | Shiga et al. ............... | 310/264 |
| 2004/0093967 A1 | * | 5/2004 | Shiga et al. ............... | 74/7 E |

FOREIGN PATENT DOCUMENTS

| | | | | |
|---|---|---|---|---|
| JP | A 11-117839 | | 4/1999 | ........... F02N/11/08 |
| JP | 2004124871 | * | 4/2004 | ........... F02N/15/02 |
| JP | 2004187436 | * | 7/2004 | ........... H02K/13/00 |

* cited by examiner

Primary Examiner—Karl E. Tamai
(74) Attorney, Agent, or Firm—Oliff & Berridge, PLC

(57) ABSTRACT

A starter for an internal combustion engine is provided which includes a pair of angular contact ball bearings used to support an armature shaft. The bearings are disposed close to opposed ends of a core of an armature. The core has disposed thereon coils which define a commutator on one of the ends of the core. One of the bearings is disposed within an inner periphery of the commutator. This structure results in a decreased interval between the bearings, thus ensuring stability in supporting the armature shaft during rotation, which results in decreased mechanical vibrations, magnetic noises, and wear of the bearings.

10 Claims, 3 Drawing Sheets

ARMATURE SUPPORT STRUCTURE OF STARTER FOR AUTOMOTIVE ENGINE

BACKGROUND OF THE INVENTION

1. Technical Field of the Invention

The present invention relates generally to a starter working to start internal combustion engines, and more particularly to a support structure for an armature of a motor of such a starter.

2. Background Art

In recent years, demands for light weight, compact, and low cost structures of automotive starters have been getting severe all the more. In order to reduce the size, starters have become prevalent which are equipped with a high-speed motor and a reduction gear working to reduce the speed of the motor to produce an increased torque output, however, there has been an increasing need for a higher reduction gear ratio. This has resulted in an increase in speed of an armature of the motor up to 20000 rpm or more, thus requiring further improvement in balancing the armature mechanically.

The above, however, conflicts with reduction in manufacturing cost of the starters. The omission of the balancing operation will result in deflection of the armature shaft and vibrations of bearings during rotation of the motor, which leads to a change in air gap in the motor, thus resulting in mechanical and magnetic noises of the motor and wear of the bearings.

In order to avoid the above problems, Japanese Patent First Publication No. 11-117839 (U.S. Pat. No. 6,114,772 assigned to the same assignees as that of this application) teaches installation of two bearings close to an armature shaft of a starter motor to minimize mechanical deflection of the armature shaft. The starter motor, however, has a commutator which results in an increased interval between the bearings, thus encouraging ease of bending of the armature shaft. This requires the need for balancing the armature in a conventional manner, thus resulting in a difficulty in reducing the manufacturing costs.

SUMMARY OF THE INVENTION

It is therefore a principal object of the invention to avoid the disadvantages of the prior art.

It is another object of the invention to provide a light weight and low cost structure of a starter for internal combustion engines designed to ensure a desired operation of the starter without undesirable mechanical vibrations and/or magnetic noises.

According to one aspect of the invention, there is provided a starter for an internal combustion engine which comprises: (a) an armature made up of an armature shaft, a core, and coils, the core being made of a laminate of plates and installed on the armature shaft, the core having a first and a second end opposed to each other, the coils being disposed therearound and defining a surface commutator on the first end thereof, the surface commutator having an inner periphery formed therein; and (b) a first and a second ball bearing which work to support the armature shaft rotatably. The first and second ball bearings are disposed close to the first and second ends of the core. Specifically, the first and second ball bearings are arranged adjacent the core directly without any undesirable parts such as the commutator disposed between each of the bearings and the core, thus resulting in a decreased interval between the ball bearings, thereby minimizing deformation of the armature shaft during rotation thereof. The first ball bearing is disposed within the inner periphery of the surface commutator, which results in a further decrease in interval between the bearings, thereby increasing mechanical balance of the armature shaft during rotation.

In the preferred mode of the invention, the first and second ball bearings have inner peripheries fitted on the armature shaft and outer peripheries fitted on a frame surrounding the armature.

The commutator includes a conductor coil that is a portion of the coils of the armature. This facilitates ease of installation of the first ball bearing within the inner periphery of the commutator without need for increasing an inner diameter of the commutator. This is also advantageous to withstand the centrifugal force acting on the commutator.

The starter further comprises a thrust applying mechanism working to apply thrust to the first and second ball bearings to minimize clearances or play in the first and second ball bearings. This minimizes mechanical vibrations, magnetic noises, and/or wear of the bearings without need for balancing the armature.

The thrust applying mechanism may include an elastic member working to apply a spring pressure to brushes used to supply power to the surface commutator. For example, a brush spring may be used as the elastic member, thereby avoiding an increase in component parts of the starter.

The thrust applying mechanism may include a spring working to apply a spring pressure to brushes used to supply power to the surface commutator and a disc spring working to apply a spring pressure to the first and second bearings. The disc spring is simple in structure and inexpensive, thus minimizing an increase in production cost of the starter.

The first and second ball bearings are implemented by angular contact ball bearings which are suitable for minimizing the clearances in the bearings using the thrust acting on the bearings. Use of the angular contact ball bearings minimizes a shift in center of the armature shaft.

Ech of the angular contact ball bearings has an outer and an inner ring at least one of which is made by pressing a plate. This results in a decrease in manufacturing cost of the starter.

The starter further comprises a planetary reduction mechanism disposed within a starter housing, an output shaft, and a pinion stalled on the output shaft. The planetary reduction mechanism such as a planetary reduction gear works to reduce speed of the armature and transmit it to the output shaft. The pinion meshes with a ring gear of the engine when the engine is started. Use of the planetary reduction mechanism eliminates addition of bending moment of the ring gear to the armature shaft, thereby further decreasing the mechanical vibrations of the starter.

The starter further includes a cylindrical yoke, frames, and a brush holder. The yoke includes magnetic poles made of permanent magnets or electromagnets. The frames are so disposed on sides of the yoke as to surround the armature. The planetary reduction mechanism and the brushes are installed outside the frames and the yoke. Specifically, only the yoke and the frames are used to retain the bearings firmly, thus ensuring mechanical stability of the armature.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
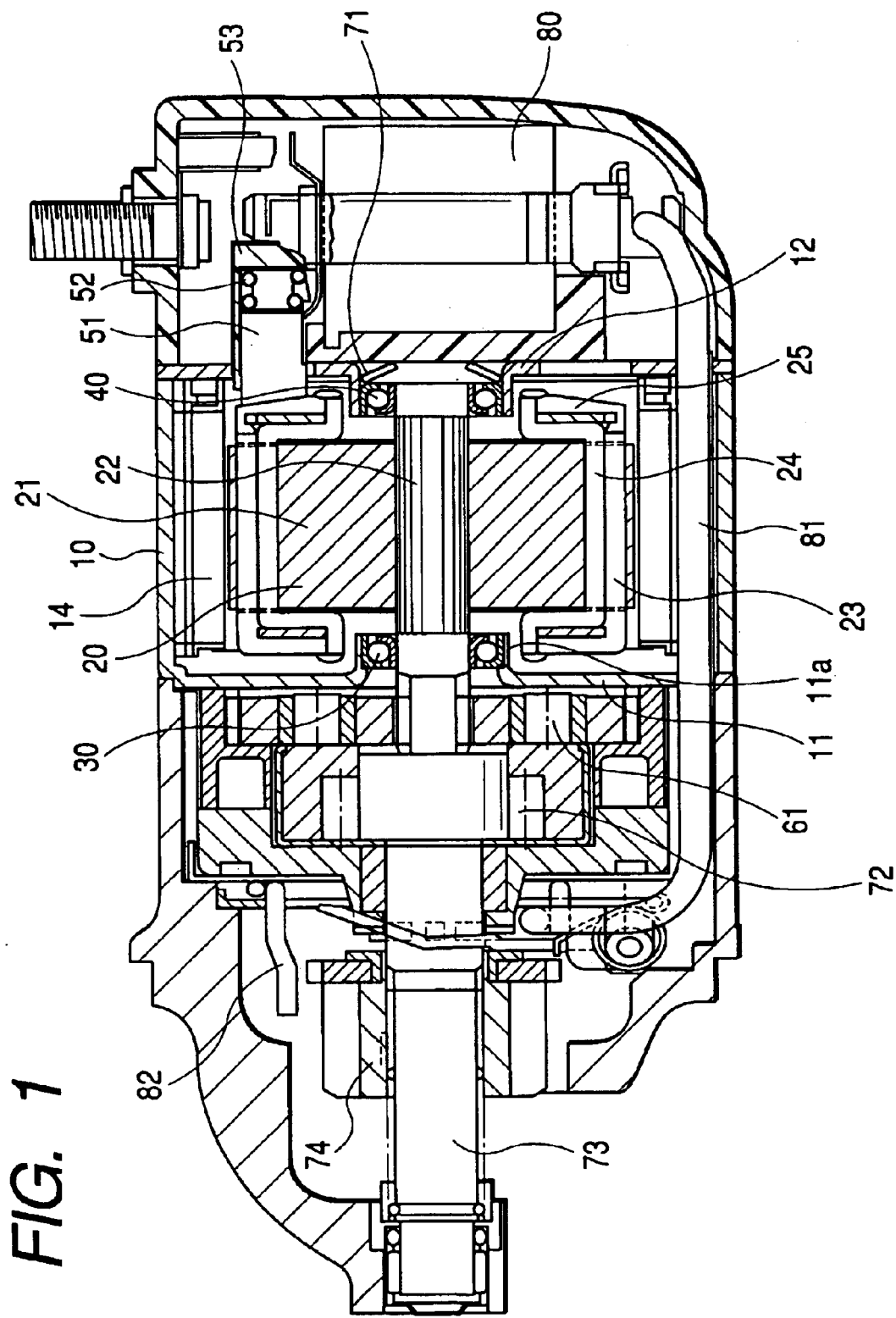
FIG. 1 is a longitudinal sectional view which shows an internal structure of a starter according the invention.

Referring to the drawings, wherein like reference numbers refer to like parts in several views, particularly to FIG. 1, there is shown a starter according to the invention which may be used in starting automotive internal combustion engines.

Figure 3:
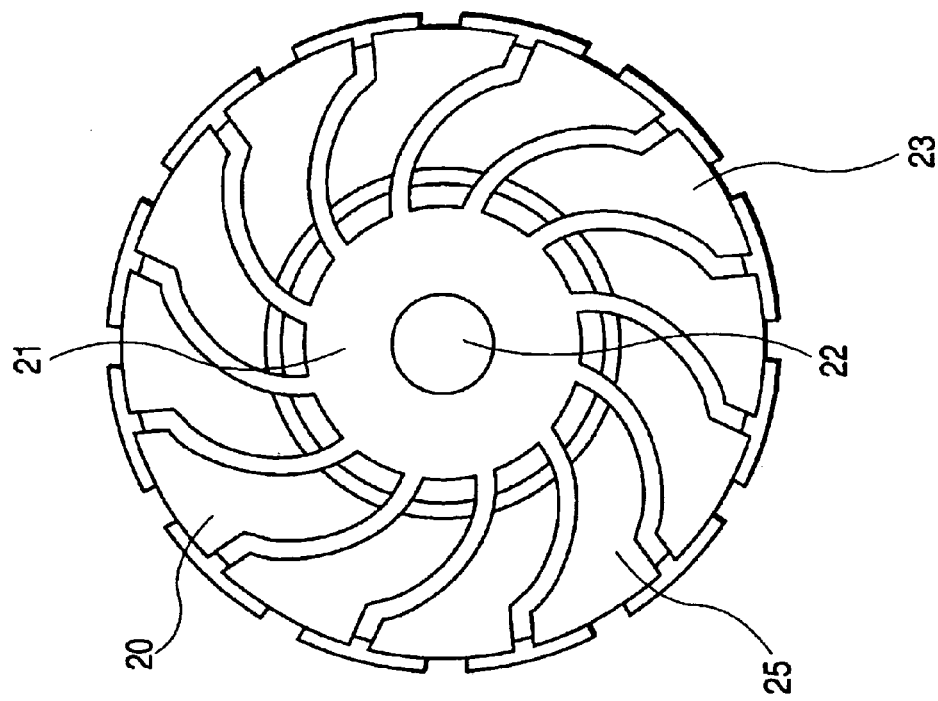
FIG. 3 is a side view of the armature as illustrated in FIG. 2.
Figure 4:
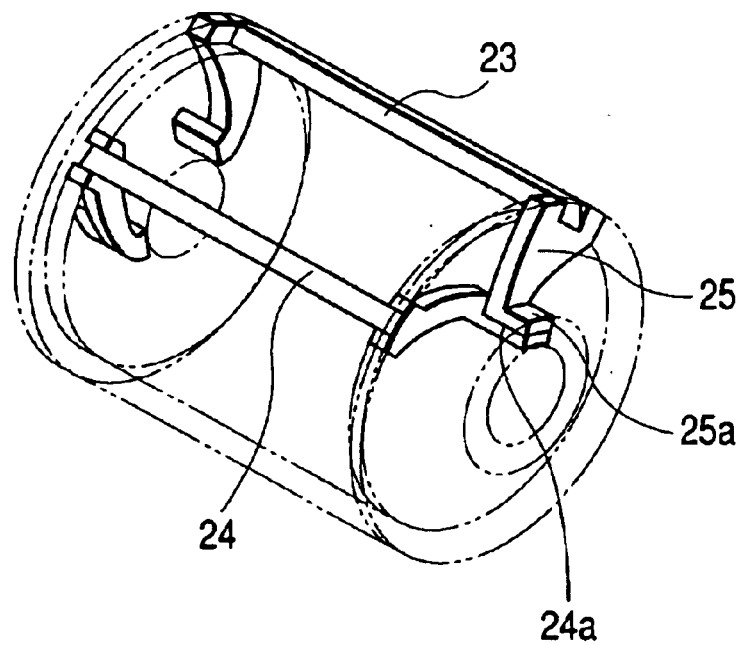
FIG. 4 is a perspective view which shows the armature as illustrated in FIG. 2.

The starter includes an armature 20 which consists of a core 21, an armature shaft 22, outer coils 23, and inner coils 24. The core 21 is made of a laminate of plates and affixed to the armature shaft 22 in a known manner. The outer and inner coils 23 and 24 are, as clearly shown in FIGS. 3 and 4, disposed in grooves formed in the periphery of the core 21, respectively. The outer and inner coils 23 and 24 are, as clearly shown in FIG. 2, of a substantially C-shape and joined together at ends 23a and 24a to form a winding as a whole.

The outer coils 23 define an end surface 25 which works as a surface commutator to perform commutation together with brushes 51.

Figure 2:
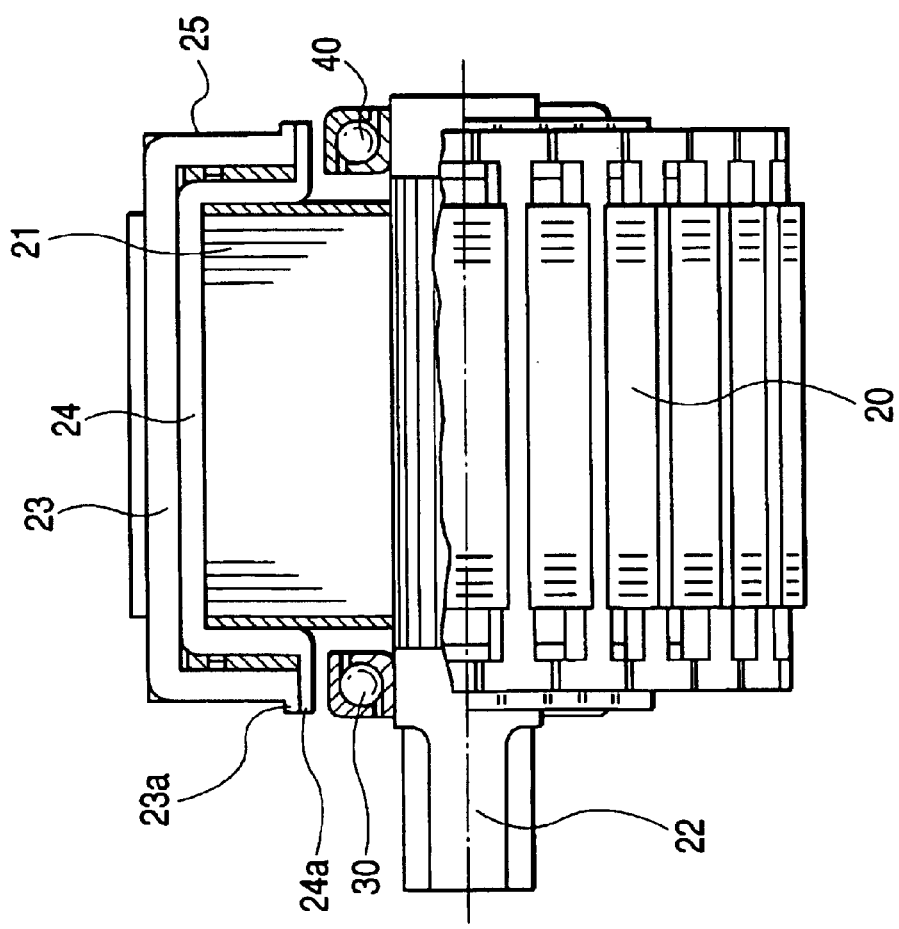
FIG. 2 is a partial sectional view which shows an armature installed in the stator of FIG. 1.

The stator also includes angular contact ball bearings 30 and 40 which are, as clearly shown in FIG. 2, installed on the armature shaft 22 close to opposed end surfaces of the core 21 and surrounded by the ends 24a of the inner coils 24a. Each of the bearings 30 and 40 is preferably located at an interval away from one of the end surfaces of the core 21 which is shorter than the width of the bearings 30 and 40.

Figure 5:
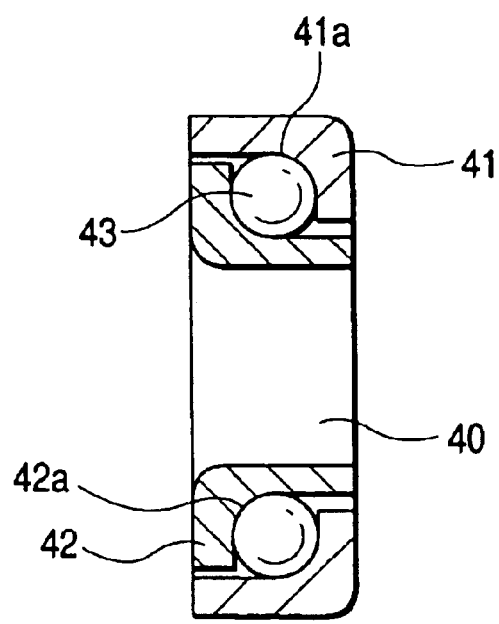
FIG. 5 is a sectional view which shows an angular contact ball bearing used to support an armature shaft of the stator of FIG. 1.

The angular contact ball bearings 30 and 40, as clearly shown in FIG. 1, have outer peripheries secured to a cylindrical yoke 10 through frames 11 and 12, respectively. The bearing 40 is, as clearly shown in FIG. 5, made up of an outer ring (also called an outer race) 41, an inner ring (also called an inner race) 42, balls 43, and a cage (not shown). The outer and inner rings 41 and 42 each may be made by pressing a plate. Application of thrust loads to the bearing 40 will causes the outer and inner rings 41 and 42 to push the balls 43 at round portions 41a and 42a tightly to carry the thrust load and eliminate clearances between the outer and inner rings 41 and 42 and the balls 43. The bearing 30 has the same structure as that of the bearing 40, and explanation thereof in detail will be omitted here.

The yoke 10 has magnetic poles 14 formed by permanent magnets or electromagnets. The yoke 10 and the armature 20 constitute a stator motor. The bearings 30 and 40 have the inner rings 42 affixed to the armature shaft 22 and the outer rings 41 fitted within inner peripheral walls of the frames 11 and 12 to be slidable in lengthwise directions of the armature shaft 22. The frame 11 has a shoulder 11a which holds the bearing 30 from moving in one of the lengthwise directions of the armature shaft 22 (the left direction as viewed in FIG. 1).

Two types of thrust loads are applied to the bearings 30 and 40. One is produced by a spring pressure of a coil spring 52 (typically called a brush spring) which works to push the brushes 51 disposed within a brush holder 53 and act on the bearing 30. The second is produced by a spring pressure of a disc spring 71 acting on the outer ring 41 of the ball bearing 40 directly. Specifically, the second thrust load is transmitted from the outer ring 41 of the bearing 40, to the balls of the bearing 40, to the inner ring 42 of the bearing 40, to the armature shaft 22, to the inner ring 42 of the bearing 30, the balls of the bearing 30, to the outer ring 41 of the bearing 30, and to the frame 11. The torque produced by the armature 20 is transmitted to a pinion 74 through a planetary reduction gear 61, a clutch 72, and an output shaft 73. A magnet switch 80 is installed adjacent the stator motor (i.e., the armature 20). The magnet switch 80 works to open or close contacts leading to a battery (not shown) and the armature 22, respectively, to turn on or off the stator motor. The magnet switch 80 also works to move a connecting rod 81 and a stopper 82 to hold the pinion 74 from rotating and to move the output shaft 73 in a lengthwise direction thereof to establish engagement with a ring gear (not shown) connected to the engine.

In operation, when a key switch (not shown) such as an ignition switch of the engine is turned on, the magnet switch 80 attracts the connecting rod 81, so that the stopper 82 engages a gear installed on the pinion 74 to hold the pinion 74 from rotating. The magnet switch 80 also closes the contacts to supply the power to the armature 20, so that the armature 20 starts to rotate, thereby rotating the output shaft 73. The output shaft 73 meshes with the pinion 74 through spiral splines, so that the pinion 74, which is prohibited by the stopper 82 from rotating, moves in the left direction, as viewed in FIG. 1, to engage the ring gear for stating the engine. This operation is discussed in detail in Japanese Patent First Publication No. 10-115274 and U.S. Pat. No. 6,114,772, issued Sep. 5, 2000, assigned to the same assignees as that of this application, disclosures of which are incorporated herein by reference.

The angular contact ball bearings 30 and 40 are, as described above, disposed inside the coils 23 and 24 (i.e., the surface communtator). In other words, the bearings 30 and 40 are located close to the core 21, thereby resulting in a greatly decreased deflection of the armature shaft 22 during rotation thereof. The springs 52 and the 71 apply the thrust loads to the bearings 30 and 40 to decrease a bearing clearance to zero (0), thereby eliminating any play of the bearings 30 and 40 during rotation of the armature shaft 22. This eliminates the need for physically balancing the armature 20. The starter is usually not used frequently, that is, employed only in starting the engine. A certain decrease in load capacity of the bearings 30 and 40 is, therefore, not objectionable in use of the stator, thus permitting at least one of the outer and inner rings 41 and 42 of each of the bearings 30 and 40 to be made by pressing a plate, which results in a decrease in manufacturing cost of the starter.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A starter for an internal combustion engine comprising:

an armature made up of an armature shaft, a core, and coils, the core being made of a laminate of plates and installed on the armature shaft, the core having a first and a second end opposed to each other, the coils being disposed therearound and defining a surface commutator on the first end thereof, the surface commutator having an inner periphery formed therein; and a first and a second ball bearing, disposed close to the first and second ends, supporting the armature shaft rotatably, the first ball bearing being disposed within the inner periphery of the surface commutator.

2. A starter as set forth in claim 1, wherein said first and second ball bearings have inner peripheries fitted on the armature shaft and outer peripheries fitted on a frame surrounding said armature.

3. A starter as set forth in claim 1, wherein said commutator includes a conductor coil that is a portion of the coils of said armature.

4. A starter as set forth in claim 1, further comprising a thrust applying mechanism working to apply thrust to the first and second ball bearings to minimize clearances in the first and second ball bearings.

5. A starter as set forth in claim 4, wherein said thrust applying mechanism includes an elastic member working to apply a spring pressure to brushes used to supply power to the surface commutator.

6. A starter as set forth in claim 4, wherein said thrust applying mechanism includes a spring working to apply a spring pressure to brushes used to supply power to the surface commutator and a disc spring working to apply a spring pressure to the first and second bearings.

7. A starter as set forth in claim 1, wherein the first and second ball bearings are implemented by angular contact ball bearings.

8. A starter as set forth in claim 7, wherein each of the angular contact ball bearings has an outer and an inner ring at least one of which is made by pressing a plate.

9. A starter as set forth in claim 1, further comprising a planetary reduction mechanism disposed within a starter housing, an output shaft, and a pinion stalled on the output shaft, said planetary reduction mechanism working to reduce speed of said armature and transmit it to the output shaft.

10. A starter as set forth in claim 1, further comprising a cylindrical yoke, frames, a reduction mechanism, and a brush holder, the yoke including magnetic poles made of permanent magnets or electromagnets, the frames being so disposed on sides of the yoke as to surround said armature, the reduction mechanism working to transmit torque of said armature to an output shaft, the reduction mechanism and the brushes being installed outside the frames and the yoke.

* * * * *